ELLIOTT & LEE.
Sheep Rack.

No. 83,840.

Patented Nov. 10, 1868.

Witnesses:
J. H. Burridge
Frank S. Alden

Inventor:
J. Elliott
W. Lee

United States Patent Office.

JOHN ELLIOTT AND WILLIAM LEE, OF CHIPPEWA, OHIO.

Letters Patent No. 83,840, dated November 10, 1868.

IMPROVEMENT IN SHEEP-RACKS.

The Schedule referred to in these Letters Patent and making part of the same.

*To all whom it may concern:*

Be it known that we, JOHN ELLIOTT and WILLIAM LEE, of Chippewa, in the county of Wayne, and State of Ohio, have invented certain new and useful Improvements in Sheep-Racks; and we do hereby declare that the following is a full and complete description of the same, reference being had to the accompanying drawings, making part of this specification, in which—

Figure 1:
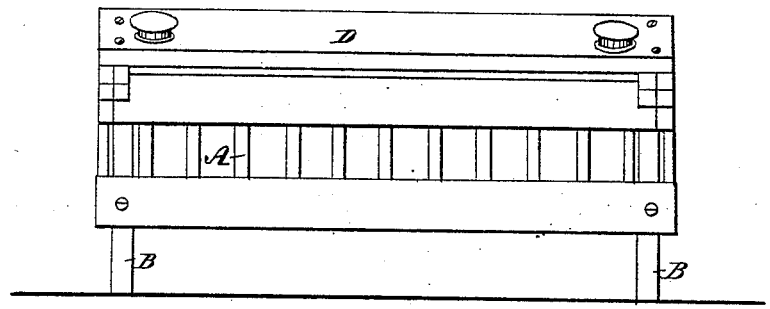
Figure 2:
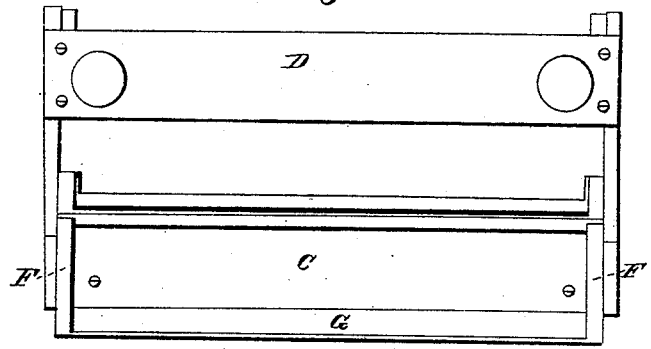
Figures 3, 4:
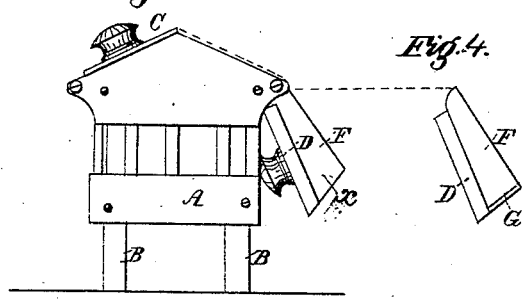

Figure 1 is a side view of the rack.
Figure 2, a view of the top and inside.
Figure 3, an end view.

Like letters of reference refer to like parts in the different views.

This invention consists of a sheep-rack, so constructed that the roof or covers of said rack, when opened, serve the purpose of troughs in which to feed grain, meal, salt, &c., thereby combining in one a feeding-trough and hay-rack.

In fig. 1, A represents a rack, mounted upon the legs B, whereby it is elevated above the ground and dirt.

The roof or cover of said rack is constructed in two longitudinal sections, C D, and which are hinged to each side of the same by the hinges E, so that each section may be turned down as shown at x, fig. 3, whereby access may be had to the inside, for placing hay therein.

Across each end of the under side of the roof are secured end-pieces, F; and along the under edge runs a strip or side-piece, G, which, when the covers are in the position shown in fig. 3, forms a trough, into which grain or other substances may be placed for the sheep, and is of easy access to them from the ground.

These troughs, when not in use for feeding, are turned up, as shown at C, fig. 3, thereby covering the rack, and thus protecting the hay and other fodder from the rain or storms, so that it is dry and clean for the animals.

This combination of sheep-rack and feed-trough is very convenient, as the troughs are never in the way when not in use, they being turned up out of the way, so that they are not liable to get broken by being run over by the sheep or other stock.

The troughs also are much less expensive than if made in the ordinary way, and for the purpose only of feeding grain, but, constructed and arranged as above described, they serve the twofold purpose of roofing for the rack and grain-trough, as above said.

What we claim as our invention, and desire to secure by Letters Patent, is—

The hinged covers C D, so arranged and combined with the rack A as to form a roof when folded up, and grain-trough when turned down, in the manner as described.

JOHN ELLIOTT.
WILLIAM LEE.

Witnesses:
W. H. BURRIDGE,
HENRY COOPER.